June 12, 1951 W. F. SCHOFIELD 2,556,601
MULTIPLE TAPPING HEAD
Filed Feb. 10, 1947 5 Sheets-Sheet 1

INVENTOR
WILLIAM F. SCHOFIELD
BY
ATTORNEY

June 12, 1951 — W. F. SCHOFIELD — 2,556,601
MULTIPLE TAPPING HEAD
Filed Feb. 10, 1947 — 5 Sheets-Sheet 2
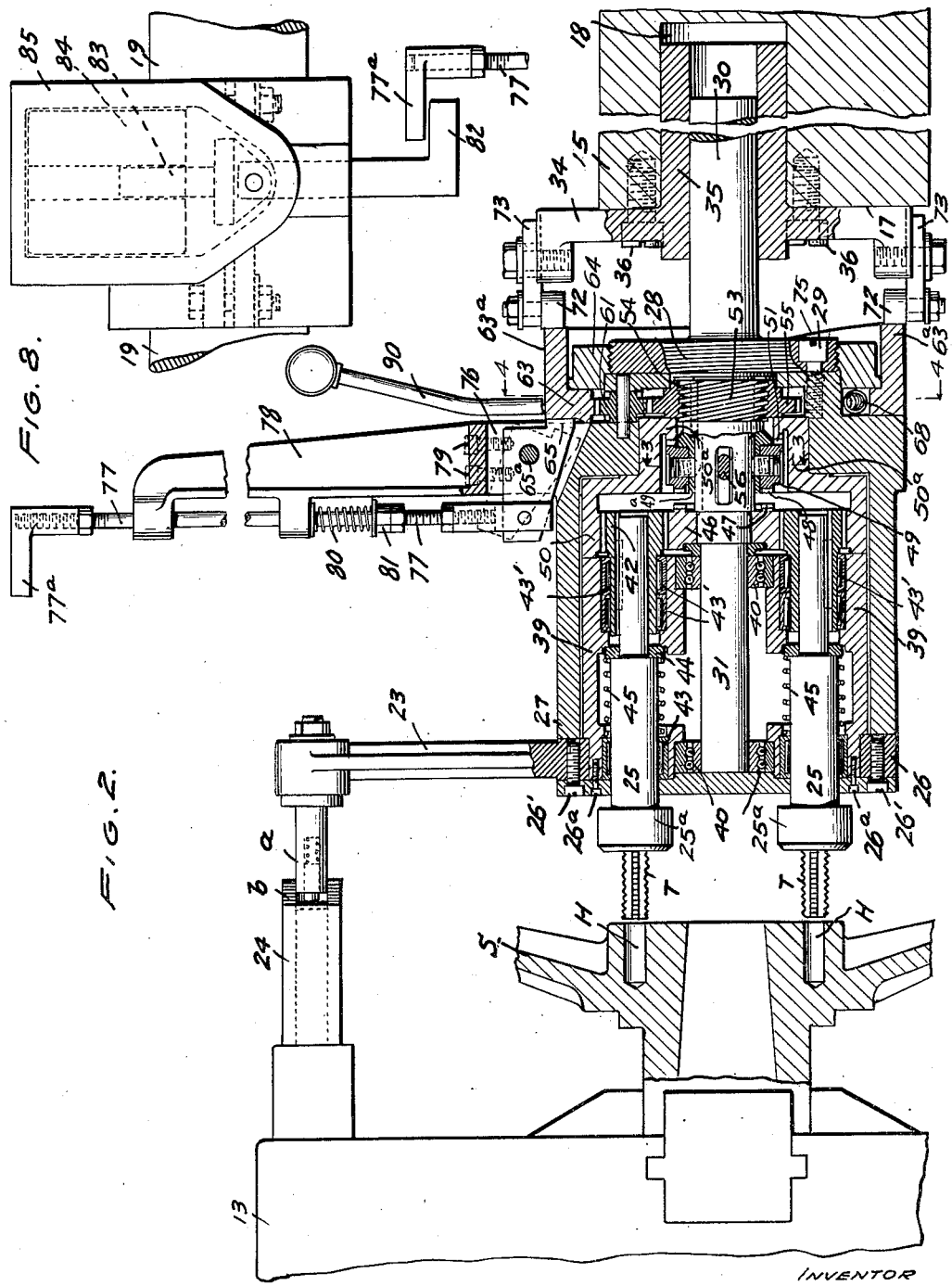
INVENTOR
WILLIAM F. SCHOFIELD
ATTORNEY

INVENTOR
WILLIAM F. SCHOFIELD
ATTORNEY

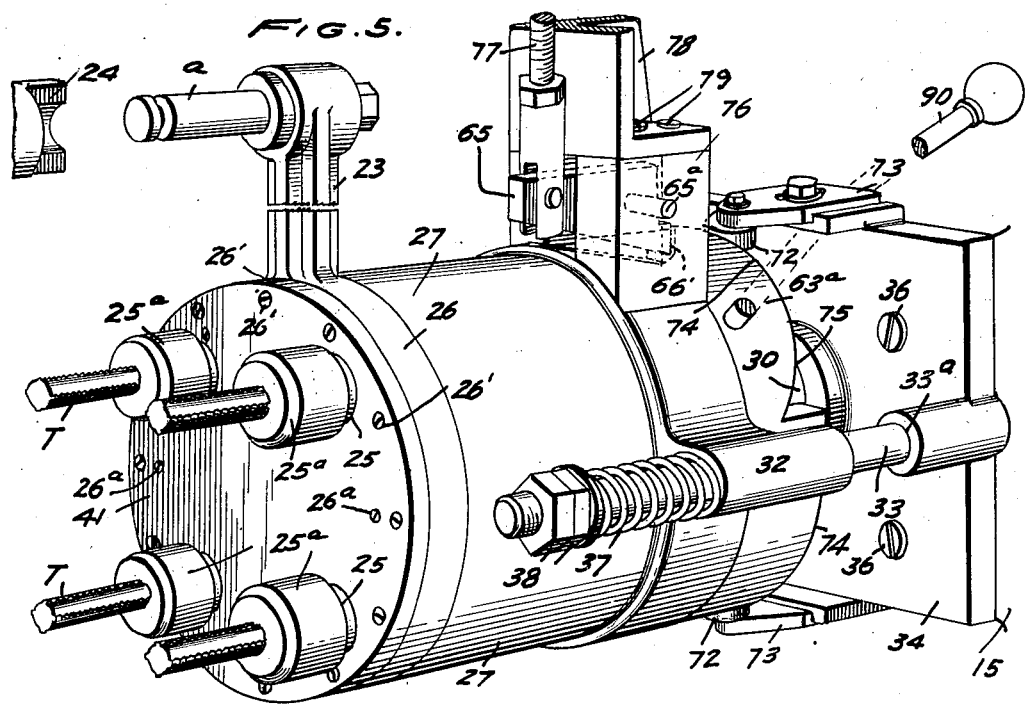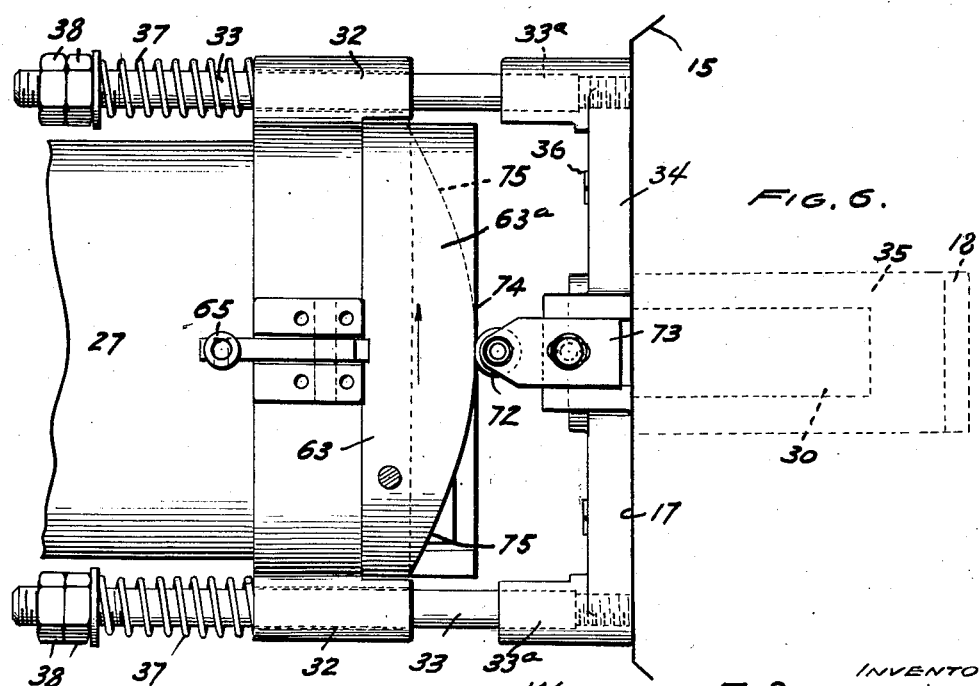

June 12, 1951 — W. F. SCHOFIELD — 2,556,601
MULTIPLE TAPPING HEAD
Filed Feb. 10, 1947 — 5 Sheets-Sheet 5
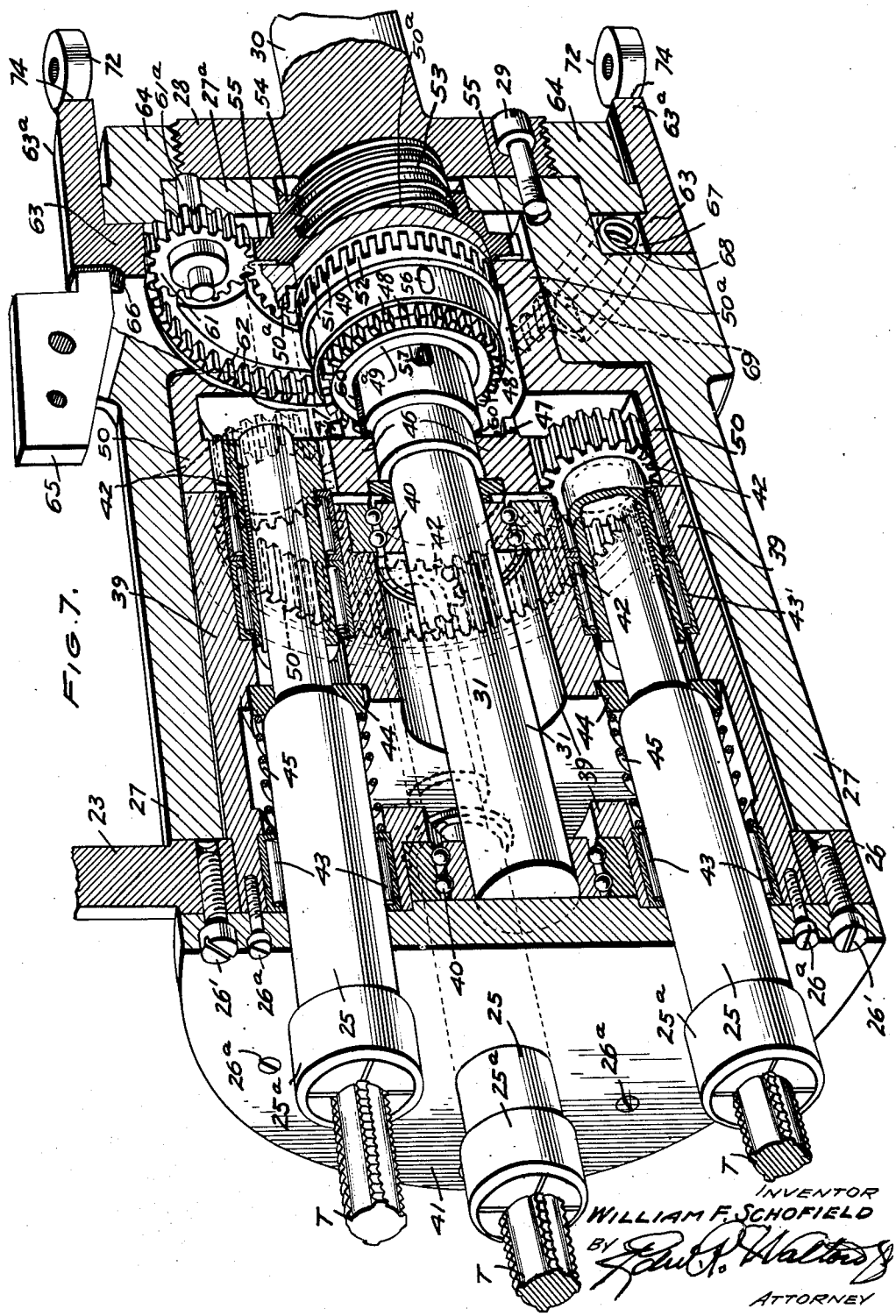
INVENTOR
WILLIAM F. SCHOFIELD
BY
ATTORNEY Patented June 12, 1951

2,556,601

UNITED STATES PATENT OFFICE 2,556,601

MULTIPLE TAPPING HEAD

William F. Schofield, Pawtucket, R. I., assignor, by mesne assignments, to Niles-Bement-Pond Company, West Hartford, Conn., a corporation of New Jersey Application February 10, 1947, Serial No. 727,517

17 Claims. (Cl. 10—130)

This invention relates to automatic turret lathes and, more particularly, to multiple spindle head attachments for use on the turrets of such lathes.

Specifically, the invention relates to a multiple spindle head attachment to be mounted on one face of the turret and which is adapted to tap or thread a number of holes in a subject or work-piece during the forward feed movement of the turret and to automatically reverse the rotation of the taps and withdraw them from the subject while the turret slide is not in motion or is on the dwell of the slide operating cam.

An automatic turret lathe customarily comprises a bed with a head stock at one end, a tail stock in the form of a turret at the other end, and a transversely-positioned cross slide therebetween. Frequently, a longitudinally-extending pilot bar is supported by the head stock to cooperate with a bracket on the turret for assuring alignment and rigidity between the work-piece and the tools on the turret. A driven spindle having a work supporting chuck at one end is journalled in the head stock and aligned with the turret which is rotatably mounted about a vertical axis. The turret is mounted on a slide adapted for movement toward and away from said spindle by cam or other positive means.

The turret is provided with a plurality of vertically planed faces, each having a locating hole therein, upon each of which different tools or tool holders may be mounted. The machine is powered and controlled so that the various elements function automatically and in timed relation relative to each other. The operation of the machine is controlled by a multiple cam assembly, known as a "dog drum," and is adapted to motivate the machine to advance and retract the turret slide and the cross slide relative to the subject or chuck in proper working sequence and, also, to index the turret so as to present, in sequence or selectively, the tool or tools mounted on the faces thereof to the subject. The tools mounted on the turret may be of a wide variety as is well known in the art, including drills for drilling a plurality of holes in the subject. In the latter case and for this purpose, a multiple spindle drill head is provided with means for cooperating with the chuck to register the spindles relative to the subject and to rotatably drive the drill-spindles so that their drills may perform their drilling function.

These multiple drilling-spindle heads usually comprise a cage that is rotatably mounted within the head and an arm that extends forwardly to cooperate with a mating device on the rotatably driven chuck. The drill-spindles are rotatably mounted within the cage and each is provided with a pinion in mesh with a stationary gear fixed in the head. By this structure, the cage is rotated in conjunction with the chuck, by its connecting arm, and carries the spindles with it through a revolving path. The pinions carried by the drill-spindles travel as planets around the fixed gear and thereby rotate their respective spindles as they are advanced into the subject by the forward feed movement of the turret slide and are removed by the retraction of the turret slide. In view of the fact that the drills cut smooth and straight bored holes, they may be withdrawn by the retraction of the turret slide despite the fact that they are continuously rotated in the same direction by the connection with the chuck. In other words, it is unnecessary to reverse the rotation of the drills to effect their removal from the drilled holes.

Heretofore, the use of multiple spindle heads has been restricted to use for drilling only and has been incapable of use in tapping or threading because it has been considered impossible to reverse the direction of rotation of the spindles to permit the unthreading of the taps prior to the retraction of the turret slide. Therefore, the tapping operation has necessarily been performed by special tapping machines or drill presses. Of course, a drive system might be projected through the turret, and thence to the tool spindles, but such an arrangement would be extremely complicated and prohibitive in cost, so that a separate drill press has been preferable.

Having in mind the limitations of the prior art apparatus, it is an object of this invention to facilitate the cutting of threads on a subject work-piece by means of an attachment on an automatic turret lathe, and thereby eliminate the necessity of a separate tapping machine and the labor involved in the additional handling of the subject.

The invention therefore contemplates a multiple spindle tapping head for a turret lathe wherein the tap-spindles are driven from the chuck-spindle for performing the tapping operation and means are provided for automatically reversing the rotation of the spindles to unthread the taps and to effect retraction thereof prior to, or in conjunction with, the retraction of the turret slide while being driven from the chuck spindle.

The novel features that are considered characteristic of this invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout, and in which:

Figure 2 is a cross sectional view taken vertically and longitudinally through the tapping head and the subject or workpiece;

Figure 5 is a view in perspective of the tapping head;

Figure 6 is a top plan view of the tapping head;

Figure 7 is a sectional view in perspective taken on a plane axially of the structure; and Figure 8 is a fragmentary view showing the latch releasing means.

Figure 1:
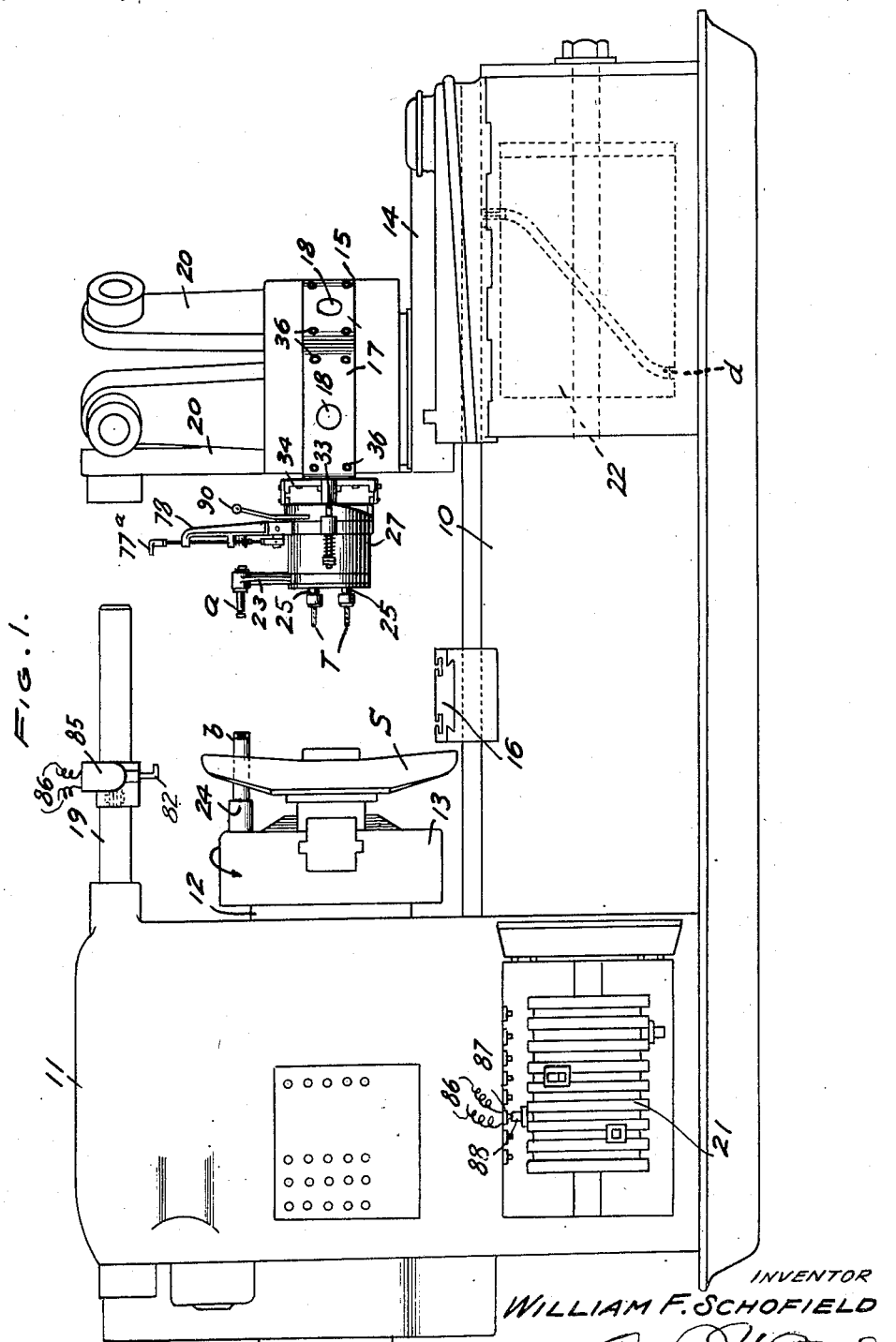
Figure 1 is a diagrammatic side view in elevation of an automatic turret lathe with the multiple spindle tapping head comprising the present invention mounted on the turret.

A multiple spindle tapping head for use with turret lathes to overcome the limitations, hereinbefore enumerated, should have at least two totally distinct characteristics: it should be capable of reversing the rotation of the spindles to unthread the taps; and it should also be capable of resilient retraction independent of the retraction of the turret slide. To better understand the application of the invention, reference is made to Fig. 1 which diagrammatically illustrates an automatic turret lathe.

The machine comprises a bed 10 having a head stock 11 at one end which has journalled therein a spindle 12 equipped with a work holding chuck 13 on the nose thereof, a slide 14 mounted on the bed for to-and-fro movement relative to the chuck and having a turret 15 indexibly mounted thereon, and a cross slide 16 mounted on said bed between the turret slide and said chuck. The turret 15 is formed in the general shape of a polygon whose faces 17 lie in planes perpendicular to the working axis of the machine and each of the faces has a tool-holder receiving aperture 18 that is positioned so as to align the holder with the working axis of the machine as the respective faces 17 are moved to working position.

A pilot bar 19 is mounted in the top of the head stock 11 and extends longitudinally of the machine above the working axis thereof to extend into an opening in pilot brackets 20 on the turret for steadying purposes as is well known in the art. A suitable power system and various control arrangements, all of known design which form no part of this invention, are enclosed within the housing beneath the bed 10 and within the head stock 11. Included in this drive and control mechanism is a dog drum 21, as is customary, and of known design, which has a plurality of adjustable dogs, or like elements, thereon for effecting the sequence of operations of the machine, this drum being driven in synchronism with the rotation of the spindle and feeding movements of the slides 14 and 16.

In a machine of this type the various operations are performed automatically and successively in a predetermined cycle although this tapping head may be employed on non-automatic turret lathes.

After a subject or work-piece S is positioned on the chuck 13, the machine may be started and thereafter the chuck will be rotated continuously in one direction, counterclockwise, until stopped, and the turret slide 14 may be advanced toward the work piece by a cam drum 22 under the bed 10 to bring tools on one of the turret faces into operation; after which the turret slide 14 will be retracted and the turret 15 indexed one or more faces and then advanced to bring other tool or tools into operational engagement with the work-piece S after which the turret slide is again retracted. These various operational steps may be performed in a variety of sequences, all of which may be controlled and effected by the dog drum 21; and one of these operations may be drilling one or a plurality of openings into the workpiece.

In the present instance the invention is concerned with a specific type of tool for use on but one face of the turret 15.

Among the various tools that are commonly employed on the turrets of machine tools of the lathe type are multiple spindle drill-heads that are rotatively driven by a releasable connection with the driven chuck 13. Such heads are similar in some respects to the tool of the present invention shown in Figure 1, in that they comprise a plurality of spindles 25 which are mounted in a housing 27 and provided with a crank arm 23 for engaging and meshing with a cooperating bracket or member 24 mounted on the face of the chuck 13, whereby the spindles 25 are revolved about the axis of the housing by the chuck 13, and each of the spindles 25 is simultaneously rotated about its own axis. This type of structure has been limited exclusively to use for drilling operations due to the fact that the drills carried by the spindles 25 were brought into working engagement with the work-piece S by the feed movement of the turret slide 14 and withdrawn from the holes that they had drilled by the retraction of the turret slide 14 by its cam 22 or other means. Tools of this type have been limited to use for drilling operations because they have been incapable of reversing the spindle drive, as required by tapping tools. Furthermore, even if a reversing drive were evolved there has been the problem of retracting the turret 15, in accordance with the unthreading of the taps from the threads, so that there would be no axial strain to injure the threads or damage the taps. These difficulties have now been overcome in accordance with the present invention as best shown in Figures 2 and 7.

The tapping head, of the present invention, comprises a cylindrical hollow housing 27, reduced at its rear end to form a central opening closed by an end plate 28, secured in place by bolts 29. Centrally projecting outwardly from said plate 28 and coaxially with the axis of the housing 27 is a supporting arm 30; and similarly projecting from the other side of said plate 28 and extending into the housing 27 is an arbor 31, the arm 30 and the arbor 31 being rigid or integral with the plate 28. Lugs 32 extend from opposite sides of the housing 27 and are bored to form openings or passages through which extend guide rods 33 extending axially of the housing 27 and having their rear ends fast, as at 33ª, to a tool-holder 34, which latter is in the form of a rectangular plate designed to engage directly against and be secured to a face 17 of the turret 15. Said plate has a centrally positioned cylindrical tubular projection 35 extending from its back face to provide a guiding socket into which the arm 30 fittedly and slidably extends. The sleeve 35 is, itself, receivable in a usual toolholder opening 18 provided on each face of the turret. The holder 34 is further secured in position on the face of the turret by the usual fastening bolts 36. Between each lug 32 and the forward ends of the guide rods 33 is interposed a compression spring 37 which is held in place by lock nuts 38 threadable on the ends of the rods 33 to vary the tension of said springs.

Concentric with and within the forward portion of the housing 27 is a spindle supporting cage member 39 rotatably mounted on the arbor 31 by means of antifrictional members 40. The front end of the cage 39 projects beyond the forward end of the housing 27 and from this projecting portion of the cage laterally extends the crank arm 23. The crank arm 23 may be integral with the cage or carried on a separate ring or band 26 fitted around the circumference of the cage and abutting the forward end of the housing 27. The ring 26 may be made fast to the cage by screw 26' extending through a front end cover plate 41 which itself is secured to the cage by screw 26ª. The crank 23 has a laterally extending arm $a$ which engages with a driving bracket 24, mounted on the face of the work holding chuck 13, when the turret slide 14 advances the arm $a$ into the path of movement of said bracket 24. The crank 23 and the bracket 24 and their operation are well known in the art and need not be described specifically—except to say, that provision is made on the arm $a$ to assure its entrance into the bore $b$ of the bracket 24 without any danger of a jam.

The tap spindles 25 are journalled in the cage member 39. In the present instance four of such tap spindles are shown and are on equal radii from and about the arbor 31, but a more or less number of such spindles may be employed according to the needs of the work to be performed and, of course, their spacing may also vary according to that of the holes H in the workpiece and which holes are to be threaded.

As each of the tap-spindles 25 are identical in structure and in mounting, only one will be described specifically. Each spindle 25 comprises an elongated shaft extending parallelly to the axis of the housing 27 and has its forward end extending through a front end cover plate 41 and on which forward end is carried a tool receiving member or gripping device 25ª of known construction. The other end of the spindle is reduced in diameter and has a sleeve pinion 42 splined thereon with the pinion portion lying outside of the rear end of the cage 39. Suitable roller bearings 43 are interposed between the forward end of the spindle 25 and said cage; and roller bearings 43' are interposed between the sleeve of said pinion 43 and said cage. At the juncture of the reduced portion of the spindle 25 is provided a laterally extending fixed flange or collar 44 providing an abutment for one end of a compression spring 45 surrounding the tapspindle and interposed between said flange and the race of the roller bearings 43. The purpose of this spring is to permit outward axial movement of the spindle against the tension of said spring when the tapping head is being retracted to withdraw the taps. By this spring some of the strain or pressure upon the threads incident to the withdrawal is relieved by yieldable movement of the spindle. When such strain has been relieved or the taps have been fully withdrawn, the spring 45 will, of course, return the spindle to its normal full line position shown in Figs. 2 and 7, this movement being permitted by the splined connection between the spindle 25 and the sleeve portion of the pinion 42.

Rotatably mounted on the arbor 31 and meshing with the pinions 42 of each of the spindles 25 is a spur gear 46 which has on its rear face a series of clutch teeth 47 meshing with similar teeth 48 on an opposing face of the shiftable clutch 49 slidably mounted on and splined to the arbor 31 rearwardly of the gear 46. An internal gear 50, of a diameter to extend around and embrace the pinions 42 of all of the spindles 25, is concentric with the arbor 31 and meshes with each of the pinions 42 on the spindles 25. This internal gear 50 has a laterally off-set reduced hub 50ª conforming with the reduced rear end opening in the housing 27 and is journalled in said opening. An outer end of said hub 50ª has an inwardly extending annular lip that lies opposite the other face of the shiftable clutch 49—from that of the gear 46—and is provided with clutch teeth 51 to be engaged by similar teeth 52 on said opposing face of the clutch 49.

Figure 3:
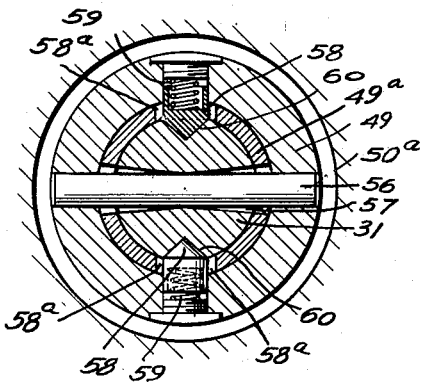
Figure 3 is a cross sectional view taken on line 3—3 of Fig. 2.

The clutch 49 as here shown may comprise an annulus surrounding a sleeve 49ª having a rear portion extending beyond the hub 50ª of the gear 50 and splined to the arbor 31, as at 49ᵇ, and which portion is provided with external spiral feeding threads or grooves 53 that mesh with similar threads and grooves 54 internally formed on a gear 55 which surrounds said rib and groove portion 53 of the clutch sleeve member 49ª. The gear 55 is disposed in a clearance between the reduced rear end 27ª of the housing 27 and another fixed abutment—which latter, in the present instance, is the outer surface of the hub end 50ª of the gear 50—thus holding and retaining the gear 55 against axial movement while permitting rotative movement thereof. Said annulus of the clutch 49 carries said clutch teeth 48 and 52 and has a slight oscillatory movement with respect to the sleeve 49ª and the arbor 31. This movement is permitted by a pin 56 that extends transversely through an axially extending elongated slot 57 in said arbor 31 and sleeve 49ª and which slot is flared outwardly from the center of the arbor and laterally of its length, as best shown in Figure 3. The slot 57 is thus formed to permit an oscillatory motion or lost motion effect by the clutch 49, when it is brought into engagement with either of the clutch teeth 47 on gear 46 or 51 of gear 50 to insure proper engagement of the teeth. This oscillatory movement of the clutch 49 is yieldably resisted and arrested by a pair of diametrically opposed resiliently biased tapered detents 58 shown in Fig. 3 extending from the annulus through enlarged openings 58ª in the sleeve 49ª and yieldably urged by the springs 59 to engage in elongated and correspondingly shaped grooves 60 on the arbor 31, so as to center the clutch member after the engagement of the clutch teeth has been accomplished.

Consequently, it will be seen that the gears 46 and 50 are free running gears, except when engaged by the clutch 49. When the clutch is shifted by the movement of the gear 55 to bring its teeth 52 into engagement with the teeth 51 of the gear 50, the gear 50 will be rendered stationary or fixed and, should the cage 39 be rotating, the spindles 25 will be rotated in one direction; whereas, when the clutch member is shifted by the gear 55 to bring the teeth 47 and 48 into engagement, the gear 50 will be rendered free and the gear 46 will be rendered stationary, thus reversing the rotation of the spindle 25 while the cage 35 is rotating in the same direction as before.

Figure 4:
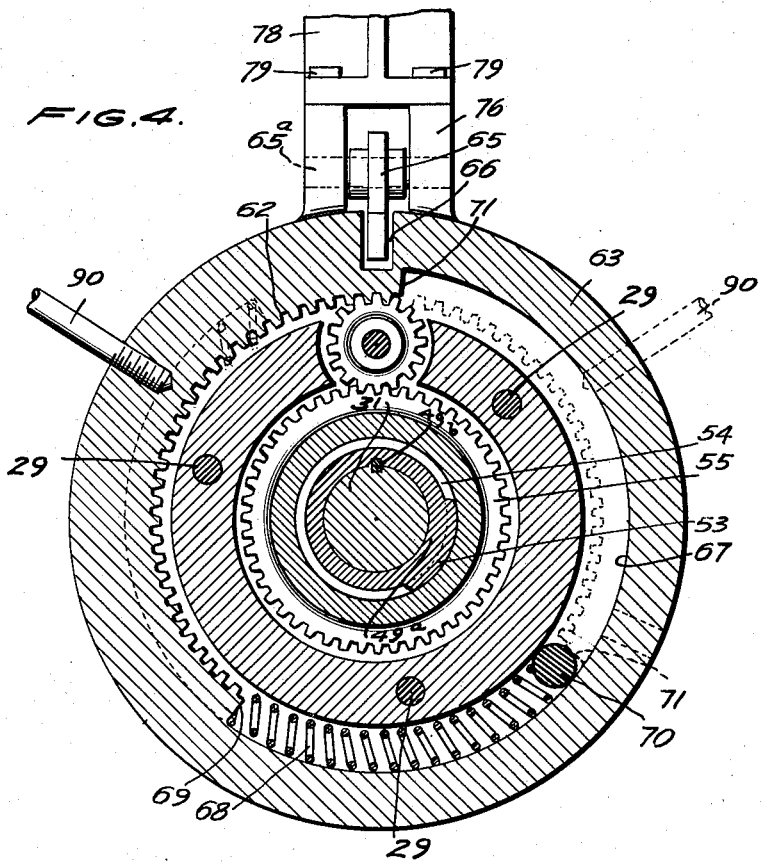
Figure 4 is a cross sectional view taken approximately on line 4—4 of Fig. 2.

The axially fixed internally threaded gear 55 meshes with the pinion 61 journalled in the housing 27, as shown in Figs. 2, 4 and 7. The pinion 61 also meshes with an internal gear segment 62 formed on a ring or annulus 63, which surrounds the exterior of the reduced end of the housing 27 and is held in place by and rotates upon a retaining collar 64 threaded on the peripheral edge of the housing rear end plate 28 in a manner to permit rotation of the ring 63 about the axis of the housing 27. The ring 63 may be, and normally is, held against rotation by a latch 65 adapted to cooperate with a keeper slot 66 in the ring 63. As shown in Figs. 4 and 7, the inner circumferential surface of the ring 63 is grooved, as at 67, between the ends of the gear segment 62, and in a portion of which groove is disposed a compression spring 68 having one end bearing on the shoulder 69, formed by one end of the internal gear segment 62, and the other end bearing against a pin 70 extending transversely of the groove 67 and is fixed at its ends in the stationary housing structure 27. The pin 70 is so positioned in the groove 67 that, when the spring 68 is compressed, said pin is about one-half way of the length of the groove 67 and, when the latch 65 releases the ring 63, the spring 68 expands to rotate the ring 63 in a clockwise direction and brings the shoulder 71, formed by the other end of the gear segment 62, against the fixed pin 70, thus limiting the movement of the ring 63, as shown in the dotted line position in Fig. 4. This movement of the gear segment 62 through its arc drives pinion 61 which, in turn, drives gear 55, which latter causes the threads 53 and 54 to shift the clutch member 49 to disengage clutch teeth 51 and 52 and to engage the clutch teeth 47—48 to render the gear 46 stationary or fixed.

This movement of the ring 63 serves the additional function of unlocking the tapping head housing 27 from its tapping position and to allow it to be placed under a yieldable retracting influence to move toward the turret 15. This is accomplished by providing the ring 63 with a lateral rearwardly extending annular flange or rim 63ᵃ whose edge is designed to bear against and ride upon two roller-abutments 72 diametrically disposed with respect to the flange 63ᵃ and journalled in adjustable brackets 73 carried on the tool-holder 34. The flange 63ᵃ is of such width that diametrically opposite edge portions 74 thereof, when engaged by the rollers 72, cause the tapping head housing 27 to move forwardly on the guide rods 33 (away from the holder plate 34) so as to compress the springs 37 and to retain the housing in this forward position for a tapping operation. This movement to forward position corresponds at least to the distance taps T will have to move to be withdrawn from the threaded holes H. The flange 63ᵃ is further formed on other diametrically opposite portions of its outer edge with gradual cut-away or receding portions 75—which, in effect, provide cam surfaces—and also ride upon the rollers 72. Thus, when the ring 63 is moved by the spring 68 to its dotted line position in Fig. 4, the reduced portions 75 of the ring flange 63ᵃ are moved opposite rollers 72, thus unlocking the tapping head housing 27 from its tapping position and permitting the springs 37 to exert a yieldable pressure tending to move said housing rearwardly toward the turret 15, during the reverse rotation of the tap-spindles 25, for withdrawing the taps from the threaded holes H in the workpiece S. The depth of the cutaway or reduced surface 75 will, in all cases, be sufficient to permit the complete withdrawal of the taps from the threaded openings in the workpiece S before said surface 75 contacts the rollers 72 which, of course, limit the further withdrawal movement of the housing 27. After this withdrawal of the taps T, the tapping head may be reset for a tapping operation by manually moving the hand lever 90, carried by the ring 63, from its dotted line position to its full line position, as shown in Fig. 4.

The latch 65 is, preferably, mounted between and pivoted, as at 65ᵃ, to the two upstanding ears 76 rigid on the top rear portion of the housing 27 and is blade-like in form to engage in the slot 66 cut in the edge of the ring 64. The end of the latch 65, opposite its detent end, is pivotally connected, through an adjustable connection, to a rod 77 slidably mounted in a suitable supporting bracket 78 that is removably fastened by bolts 79 to the top surfaces of the ears 76. A compression spring 80 surrounds the rod 77 and has one end bearing upon a threadably adjustable shoulder 81 on the rod and the other end bearing against a fixed portion of the bracket 78 so as to yieldably urge the rod 77 downwardly to normally move the latch 65 in a position to bear against an adjacent surface of the ring 63 so that it will enter the slot 66 when the two are brought to register as by resetting the ring 63 by the lever 90, thus locking the ring 63 in position. The upper end of the rod 77 is formed with a lateral trigger finger 77ᵃ positioned to overlie a laterally extending finger 82 (see Figs. 1 and 8), when the tapping head has been moved by the turret slide 14 to or about the end of its tapping movement. The finger 82 depends from the armature 83 of a solenoid 84 disposed in a housing 85 adjustably and removably secured by any suitable means to the overhead pilot bar 19. As shown in Figure 1, the solenoid 84 is energized to lift the finger 82 by an electric circuit 86 having a switch 87 therein positioned to be actuated by a suitable adjusted dog 88 on the dog drum 21 usually disposed in the bottom of the headstock 11. Thus, by the normal control operation of the dog drum 21, at the moment the taps T have reached their required depths in the workpiece S, the dog 88 is brought into engagement to close the switch 87 to momentarily activate the solenoid 84 which will cause the retraction of the armature 83 and lift the trigger finger 82 which in turn will engage the trigger finger 77ᵃ to pull the rod 77 against the tension of the spring 80, thereby pivoting the latch 65 and move it out of the keeper slot 66.

Now the operation of the tapping-head of the present invention will be described. Assuming that a multi-spindle drill head, of known construction and mounted on one face of the turret 15, has previously drilled a number of tap-sized holes H into the workpiece S, as illustrated in Fig. 2, it is now desirable to thread the interior surfaces of these holes. Further, assuming that a multi-spindle tapping-head, of the present invention, is mounted on another or subsequent face of the turret 15 and that the said turret has been indexed to present said tapping-head to the workpiece S, which is being rotated by the chuck 13 in a counter clock-wise direction, the turret slide 14 is advanced from its rear position, shown in Fig. 1, by fast motion to a point where the forward ends of the taps T are brought quite close to the workpiece S, at which time the dog drum 21, by means of a suitable dog thereon, places the slide in slow feeding or work performing motion.

As the turret slide proceeds in its feeding motion, the laterally projecting arm $a$ of the crank 23 is moved into the path of movement of the bracket 24 mounted on the face of the chuck 13 and is engaged by said bracket, as shown in Figure 2. This engagement of the crank 23 and the bracket 24 causes the cage 39, together with its tap spindles 25, to be revolved about the arbor 31 by and synchronously with the chuck 13 and the workpiece S in a counterclockwise direction. By reason of this rotation of the cage 39 and the fact that the parts are in the position shown in Fig. 2 and full lines of Fig. 4—where the ring 63 is in its latched position and has caused the clutch 49 to engage clutch teeth 51 and 52, the internal gear 50 is held stationary, thus causing the tap spindles 25 to rotate in clockwise direction about their own axis. During this time the gear 46 rotates freely on the arbor 31, as the clutch teeth 47 and 48 are disengaged.

Now it will be understood, of course, that the position of the crank arm 23 on the cage 39 and the position of the driving bracket 24 on the chuck, will have been so relatively adjusted that, when the parts are in the position shown in Fig. 2, each of the taps T will be aligned and register with a hole H. It is preferable, of course, that the holes H in the work piece S, as well as the tap spindles, be on equal radii from a common center, as shown, although this is not necessary because the assembling of the tapping head can be arranged to tap holes on different radii. As the feed movement of the turret slide 14 continues to advance, the taps T enter the holes H and cut the threads therein in a manner well-known in the art.

At the moment the taps T have reached their required depth in the workpiece S, suitable automatic means release the latch 65. In the present illustration such releasing means may comprise the dog 88 on the dog drum 21, the movement of which being synchronized with the complete cycle of movement of the machine, closes the switch 87 energizing the solenoid 84 which lifts the rod 77 to move the latch 65 out of the keeper slot 66; whereupon, the spring 68, acting against the fixed pin 70, shifts the ring 63 to the dotted line position shown in Fig. 4, whereby the segmental gear portion 62 of the ring 63 rotates the pinion 61 to drive the gear 55, whose internal thread 54 acts upon the threaded sleeve portion 53 of the clutch member 49, to shift the clutch member to the left in Figs. 2 and 7, thus disengaging the clutch teeth 51 and 52 and engaging the clutch teeth 47 and 48 and causing the gear 46 to become fixed and the internally threaded gear 50 to become free. This causes the pinions 42, splined to the ends of the tap spindles 25 and meshing with the gear 46, to rotate the tap spindles 25 in a counter-clockwise direction about their own axis. The direction of rotation of the spindles 25 having thus been reversed, the taps will be unthreaded from the said threaded holes H and withdrawn therefrom, if the tapping head is retracted to permit said withdrawal. This retraction may be accomplished by the return movement of the turret slide 14, if such movement is slow enough—i. e., about that of the tapping feed movement. While such withdrawal movement of the turret slide is sometimes difficult to adjust or provide on some lathes, though not impossible, the present invention provides for general use a means that permits the tapping head to withdraw itself and thereby not depend on the return movement of the turret slide and which means assure against injury to the taps as well as to the newly cut threads.

Consequently, simultaneously said shifting movement of the ring 63 by the spring 68 to dotted-line position in Figure 4, which effects the reverse rotation of the tap-spindles 25, also moves the cut-away portions 75 in said ring's flange 63$^a$ opposite the roller-abutments 72, thus causing a space between the flange 63$^a$ and said abutments 72 and places the tapping-head housing 27 under the influence of the compressing spring 37, which tends to move said housing 27 rearwardly toward said abutments 72 and the turret 15 a distance equal to, or preferably slightly greater than, the tapping depth of the taps T in the holes H, while the taps T are being reversely rotated to retract out of the threaded holes H. Any undue strain placed upon the taps T by the retracting springs 37 that may damage the taps T or the threads in the holes H is compensated by the springs 45 which cushion this strain and allows axial sliding movement of the individual tap-spindles 25 yieldably outward of the head under such strain.

When the taps T have been completely withdrawn from the threaded holes H, they will be in a position relative to the workpiece S, as shown in Figure 2. This retracting operation may be accomplished while the turret slide 14 is on the dwell $d$ of its actuating means or feed cam 22 and which dwell is common in most turret lathes. Thereafter, continued movement of the cam 22 will return the turret-slide 14 to its rear or indexing position shown in Figure 1, which movement will disconnect the crank projection $a$ from the chuck bracket 24 and thereby discontinue movement of the operating mechanism of the tapping head.

With the turret 15 in its rear position, the workpiece S may be removed from the chuck 13 after stopping rotation of spindle 12 and a fresh workpiece inserted in the chuck; whereupon the machine may start another cycle of its operation to machine, drill and tap the new workpiece. However, at some time prior to the next operation of the tapping head, the reset-lever 90 must be shifted from its dotted-line position to its full line position in Figure 4, for the purpose of shifting the clutch member 49 to engage clutch teeth 51 and 52 and render internal gear 50 fixed or stationary for the next thread-cutting or tapping operation. This resetting of the ring 63, also moves the reduced or cut-away portions 75 from opposite the roller-abutments 72 and brings the full width portion 74 of the rim or flange 63$^a$ opposite said abutments to move the housing 27 outwardly on the guide-rods 33 and compress the retracting springs 37, as well as to bring the latch keeper slot 66 opposite the latch 65 which automatically enters said slot under the influence of the spring 80 to lock the ring and its associate parts in position for the next thread-cutting operation.

Although certain specific embodiments of the invention have been shown and described, it is obvious that many modifications thereof are possible. The invention, therefore, is not to be restricted except insofar as is necessitated by the prior art and by the scope of the appended claims.

That which is claimed as new is:

1. In a multi-spindle tool-head for lathes comprising a supporting means, a frame or cage supported by said supporting means and mounted to rotate about its own axis, means to rotate said frame or cage, a plurality of tool-spindles journalled in said frame or cage to rotate about their own axis, one end of said spindles being adapted to have tools attached thereto and their other ends having pinions fast thereon, and epicyclic internal and external rotatable gears meshing with said pinions, and axially movable means for alternately rendering one of said gears stationary and releasing the other to rotate, whereby the rotation of said tool-spindles may be reversed without reversing the rotation of said frame or cage.

2. In a multi-spindle tool-head for lathes comprising a supporting means, a frame or cage supported by said means and mounted to rotate about its axis, means to rotate said frame or cage, a plurality of tool-spindles journalled in said frame or cage to rotate about their own axis, one end of said spindles being adapted to have tools attached thereto and their other ends having pinions fast thereon, epicyclic internal and external gears meshing with said pinions, a non-rotating clutch member axially movable and alternately engageable with said gears to hold one against rotation and release the other, and means to shift said clutch member.

3. In a multi-spindle tool-head for lathes comprising a supporting means, a frame or cage supported by said means and mounted to rotate about its axis, means to rotate said frame or cage in one direction, a plurality of tool-spindles journalled in said frame or cage to rotate about their own axis, one end of said spindles being adapted to have tools attached thereto and their other ends having pinions fast thereon, epicyclic internal and external rotatable gears meshing with said pinions, a non-rotating shiftable clutch member axially movable and alternately engageable with said gears to hold one against rotation and release the other, a mechanism for shifting said clutch member to alternate positions, an actuator for operating said mechanism and releasably held in one position to effect one of said clutch engagements, and means for releasing said actuator at a predetermined time to allow said actuator to effect the other clutch engagement.

4. In a multi-spindle tool-head for lathes comprising a supporting means, a frame or cage supported by said means and mounted to rotate about its axis, means to rotate said frame or cage in one direction, a plurality of tool spindles journalled in said frame or cage to rotate about their own axis, one end of said spindles being adapted to have tools attached thereto and their other ends having pinions fast thereon, epicyclic internal and external rotatable gears meshing with said pinions, a non-rotating shiftable clutch member movable axially to alternately engage said gears to hold one against rotation and release the other, a feed-spiral on said clutch member, a movable member interengaging said feed-spiral to move the clutch member to its alternate positions, a biased actuator operating said movable member and including releasable means to hold said actuator against its bias to effect one of said clutch engagements, and means for releasing said actuator at a predetermined position to allow said actuator to operate under the influence of its bias to effect the other of said clutch engagements.

5. In a multi-spindle tool-head, a rotatably mounted frame or cage having a plurality of tool-spindles rotatably journalled therein about its axis of rotation, means for journalling said cage on its axis including a fixed arbor, a planetary-gear system journalled about said arbor and the planets of which being fast on said spindles and the other gears of the system having parts axially spaced with respect to said arbor, and a shiftable member splined on said arbor to alternately engage said axially spaced portions of said planetary-gear system to release one and hold the other stationary.

6. In a multi-spindle tool-head a frame or cage having a plurality of tool-spindles rotatably journalled therein about its axis, means to rotatably support said cage on its axis including a fixed arbor, a planetary-gear system journalled about said arbor and the planets of which are fast on said spindles and the other gears of the system having parts axially spaced with respect to said arbor, and a shiftable member splined on said arbor for axial movement thereon to alternately engage said axially spaced portions of said planetary-gear system to release one gear and to hold the other stationary, said spindles being slidable axially in their journals and the planet-gears being splined on said spindles, and biasing means mounted on the spindles for yieldably resisting their sliding movement in one direction.

7. In a multi-spindle tool-head a frame or cage having a plurality of tool-spindles rotatably journalled therein about its axis, means to rotatably support said cage on its axis including a fixed arbor, a planetary-gear system journalled about said arbor and the planets of which are fast on said spindles and the other gears of the system having parts axially spaced with respect to said arbor, and a shiftable member splined on said arbor and axially movable to alternately engage said axially spaced portions of said planetary-gear system to release one gear and hold the other stationary, a latchable actuator having an operative connection with said shiftable member to move the latter into engagement with one of said spaced portions of said gear system when in latched position, and means to move said actuator from its latched position, to move said shiftable member to engage the other spaced portion of said gear system.

8. A tool-head as set forth in claim 7 wherein the actuator comprises an annulus rotatably mounted to move about the axis of said arbor and biased to move in one direction of rotation and having an interior gear portion; and wherein the operable connection between said actuator and said shiftable member includes spiral threads on a hub portion of the shiftable member, a gear rotatable on said threaded hub portion by means of corresponding threads meshing with the threads on said hub portion, said gear having an operative meshing connection with the gear portion on said actuator; means to latch said actuator in a position against its bias; means to release said actuator and means for rotating said cage.

9. In a tool-head, a supporting frame or housing, tool actuating means mounted in said frame, a holder having said frame slidably mounted thereon and for detachably mounting said tool-head in operating position, spring means to move said frame in one direction on said holder, an annular member rotatably mounted substantially coaxially of the frame and having a portion provided with cam-like edges engageable with fixed abutments on said holder, whereby, when the annular member is rotated to move the high points of its cam edge in engagement with said abutments, said frame is moved on said holder against the pressure of said biasing means and, when moved to bring the low portions of its cam opposite said abutments, said frame is moved on said holder in the other direction by said biasing means.

10. In a tool-head, a supporting frame or housing, rotating tool actuating mechanism mounted in said frame and including a reversing means to change the direction of rotation of the tool actuating mechanism, a holder having said frame slidably mounted thereon and detachably mounting said tool-head in operating position, spring means to move said frame in one direction on said holder, an annular member rotatably mounted on said frame and substantially coaxially of the frame and having an operative connection with said reversing means, a rim portion having cam-like edges engageable with fixed abutments on said holder, whereby, when the annular member is rotated to move the high points of its cam edge in engagement with said abutments, said frame is moved on said holder against the pressure of said biasing means and said reversing means is operated to effect one direction of rotation of said tool actuating mechanism and, when moved to bring the low portions of its cam opposite said abutments, said frame is moved in the other direction by said biasing means and said reversing means is operated to effect the other direction of rotation of said mechanism.

11. A multiple tapping head for lathes comprising a housing having an arbor fixed centrally thereof, said housing being slidably but non-rotatably supported on a holder adapted for attachment to a slide of said lathe, a cage rotatably mounted on said arbor and having an arm operatively engageable with a rotatable part of said lathe to rotate said cage, a pair of freely mounted radially spaced gears about such arbor and within said housing, each of said gears having a clutch face, a plurality of tool-spindles journalled in said cage, pinions fast on said spindles and intermeshed as planets between said freely mounted radially spaced gears, a non-rotative clutch member on said arbor and in cooperative relation with the clutch faces of said gears, means for engaging said clutch member with said gear clutch faces alternately and including a rotatable member that is mechanically biased in one direction but may be manually biased in the other direction, said rotatable member being positioned to the rear of said housing and also including laterally extending cam-like surfaces, cam followers rigid on said holder, biasing means arranged to resiliently move said housing toward said holder, a releasable latch in one position locking said rotatable member against said mechanical bias and with the high point of said cam opposite said followers, whereby, when said latch is released, said rotatable member will be rotated by its mechanical bias causing said cam to permit the movement of said housing under the influence of its bias and said clutch member to disengage one of said gear clutch faces and engage the other and whereby converse operation is effected by manually biasing said rotatable member in the other direction against its mechanical bias.

12. A multiple tapping head for mounting on a slidable carrier of lathes and comprising a housing having an arbor fixed centrally thereof, said housing being slidably but non-rotatably supported by a holder adapted for attachment to said tool carrier of the lathe, a cage rotatably mounted on said arbor for rotation in one direction, a pair of freely mounted radially spaced epicyclic gears about such arbor and within said housing, each of said gears having a clutch face extending about the said arbor and opposing each other in axially spaced relation, a plurality of tool-spindles journalled in said cage and having tool chucks on their outer ends, said spindles being slidable in their journals to axially move inwardly and outwardly relative to said housing and being biased to move inwardly, pinions splined on the inner ends of said spindles and intermeshed as planets between said freely mounted epicyclic gears, a non-rotative shiftable clutch member reciprocal between the clutch faces of said gears to alternately engage the latter, means for moving said shiftable clutch member alternately between said gear clutch faces and including a rotatable annular member that is mechanically biased in one direction but may be manually biased in the other direction, said annular member being positioned to and mounted on the rear of said housing and also including a laterally extending cam, a cam follower on said holder, springs positioned between said holder and housing and arranged to resiliently move said housing toward said holder, a releasable latch in one position locking said annular member against said mechanical bias and with the high point of said cam opposite said followers, whereby, when said latch is released, said annular member is rotated by its mechanical bias causing said cam to permit the movement of said housing under the influence of its bias and said shiftable clutch member to disengage one of said gear clutch faces and engage the other and whereby converse operation is effected by manually biasing said annular member in the other direction of its movement against its mechanical bias.

13. A multiple tapping head for use with a lathe or like machine having a tool slide and a workpiece chuck, said tapping head comprising a housing having an arbor fixed thereon and centrally thereof and extending into the housing and outwardly and rearwardly thereof, a holder for said housing adapted for attachment to the tool slide of the lathe and having the rearwardly extending portion of the arbor slidably fitted therein and further having said housing slidably but non-rotatably supported thereon to reciprocate toward and away from the workpiece holding chuck, and spring means between the housing and said holder to bias the housing away from the chuck, a cage rotatably mounted on said arbor and having an arm operatively engageable with said chuck to rotatably drive said cage in one direction, a plurality of spindles journalled in said cage and having tool chucks on their outer ends, pinions fast on said spindles and intermeshed with a gearing system to drive the spindles from the rotation of said cage, said sytem including a reversing mechanism to change the direction of rotation of said spindles, means operatively connected with said reversing mechanism to alternately change the rotation of said spindles and including a member rotatable about said arbor and positioned to the rear of said housing and having a laterally extending cam-like surface, a cam follower on said holder, a spring means connected with said rotatable member that biases it in one direction of rotation to one position to effect one direction of spindle rotation, a latch in one position locking said rotatable member in another position against its bias to effect the other direction of spindle rotation, whereby, when said latch is released, said rotatable member is rotated by its biasing spring causing said cam to permit movement of said housing under the influence of its bias and said reversing means to change the direction of rotation of said spindles and whereby, rotation of said rotatable member to its latched position against its bias, moves and holds the housing against its bias and reverses the direction of rotation of said spindles.

14. A turret mounted tool head comprising, in combination, a casing having a rotatably mounted multiple tool supporting head therein, an arm on said head operatively engageable with a rotatable part of a lathe to rotate said head, tool spindles rotatably mounted within said head, a reversible gear system for rotating said spindles and including a shiftable member for regulating said gear system to control the direction of rotation thereof, shifting mechanism for said shiftable member, and control means for said shifting mechanism operable to reverse said gear system at the end of movement of said turret in one direction, whereby said tools at the end of said turret movement may be reversed and disengaged from the work piece.

15. A turret mounted tool head comprising, in combination, a casing having a rotatably mounted multiple tool supporting head therein, an arm on said head operatively engageable with a rotatable part of a lathe to rotate said head, tool spindles rotatably mounted within said head, a reversible gear system for rotating said spindles and including an axially movable shiftable member for regulating said gear system to control the direction of rotation thereof, shifting mechanism for operating said shiftable member, control means for said shifting mechanism operable to reverse said gear system at the end of movement of said turret in one direction, whereby said tools at the end of said turret movement may be reversed and disengaged from the work piece, and manual means to reset said shiftable member to rotate said spindles in their initial direction of rotation.

16. A turret mounted tool head comprising, in combination, a casing having a rotatably mounted multiple tool supporting head therein, an arm on said head operatively engageable with a rotatable part of a lathe to rotate said head, tool spindles rotatably mounted on parallel axes within said head, a reversible gear system for rotating said spindles and including a shiftable member for regulating said gear system to simultaneously control the direction of rotation thereof, shifting mechanism for operating said shiftable member, and control means for said shiftable mechanism adjustable to be operable to reverse said gear system at the end of movement of said turret in one direction, whereby said tools at the end of said turret movement may be simultaneously reversed and disengaged from the work piece.

17. A turret mounted tool head comprising, in combination, a casing having a rotatably mounted multiple tool supporting head therein, an arm on said head operatively engageable with a rotatable part of a lathe to rotate said head, tool spindles rotatably mounted within said head on axes parallel to the direction of movement of the turret, a reversible gear system for rotating said spindles and including a shiftable member movable in a direction parallel to the direction of movement of the turret for regulating said gear system to control the direction of rotation of said spindles, shifting mechanism for said shiftable member, and control means for said shifting mechanism operable to reverse said gear system at the end of movement of said turret in one direction, whereby said tools at the end of said turret movement may be reversed and disengaged from the work piece.

WILLIAM F. SCHOFIELD.

REFERENCES CITED

The following references are of record in the file of this patent:

UNITED STATES PATENTS

| Number | Name | Date |
|---|---|---|
| 467,787 | Baron | Jan. 26, 1892 |
| 1,385,438 | Errington | July 26, 1921 |
| 1,998,275 | Emrick | Apr. 16, 1935 |
| 2,082,757 | Reimschissel | June 1, 1937 |
| 2,343,333 | Sharpe | Mar. 7, 1944 |

FOREIGN PATENTS

| Number | Country | Date |
|---|---|---|
| 308,591 | Great Britain | Nov. 21, 1929 |
| 489,248 | Great Britain | July 22, 1938 |